(12) United States Patent
Filangi et al.

(10) Patent No.: US 10,710,739 B2
(45) Date of Patent: Jul. 14, 2020

(54) AUTONOMOUS AIRCRAFT FUEL CELL SYSTEM

(71) Applicant: Zodiac Aerotechnics, Plaisir (FR)

(72) Inventors: Sébastien Filangi, Montigny le Bretonneux (FR); Julien D'Arbigny, Paris (FR); Loïc Bouillo, Poissy (FR); Christophe Elleboode, Bazainville (FR); Franck Masset, Saint Georges Motel (FR); Guillaume Gager, Toulouse (FR); Claire Marty, Maisons Laffitte (FR); Hanane Zraiaa, Viry Chatillon (FR)

(73) Assignee: Zodiac Aerotechnics, Plaisir (FR)

( * ) Notice: Subject to any disclaimer, the term of this patent is extended or adjusted under 35 U.S.C. 154(b) by 0 days.

(21) Appl. No.: 15/825,749

(22) Filed: Nov. 29, 2017

(65) Prior Publication Data

US 2018/0086476 A1    Mar. 29, 2018

Related U.S. Application Data

(62) Division of application No. 14/963,850, filed on Dec. 9, 2015, now Pat. No. 10,040,569.

(Continued)

(51) Int. Cl.
*B64D 41/00* (2006.01)
*B64D 31/06* (2006.01)
(Continued)

(52) U.S. Cl.
CPC .............. *B64D 41/00* (2013.01); *B60L 50/72* (2019.02); *B60L 58/40* (2019.02); *B64D 27/24* (2013.01);
(Continued)

(58) Field of Classification Search
CPC ........ B64D 41/00; B64D 27/24; B64D 31/06; B64D 2041/005; B64D 2221/00;
(Continued)

(56) References Cited

U.S. PATENT DOCUMENTS 4,773,443 A    9/1988  Maurer
8,141,185 B2   3/2012  Hoffjann et al.
(Continued)

FOREIGN PATENT DOCUMENTS

CA       2700658        4/2009
CN       101043082 A    9/2007
(Continued)

OTHER PUBLICATIONS

China Patent Application No. 201580066769.6, Office Action (and Search Report) dated Mar. 4, 2019.
(Continued)

*Primary Examiner* — Hal Kaplan
(74) *Attorney, Agent, or Firm* — Kilpatrick Townsend & Stockton LLP

(57) ABSTRACT

Embodiments of the present disclosure relate generally to systems and methods for providing improved aircraft fuel cell systems. In one embodiment, the system provides separate zones, maintaining various equipment components in separate controlled hydrogen concentration zones. In one embodiment, the fuel cell system provided may be simpler such that it functions without a power converter and autonomous such that it functions without need for power from any aircraft supply.

8 Claims, 3 Drawing Sheets

Related U.S. Application Data

(60) Provisional application No. 62/089,405, filed on Dec. 9, 2014.

(51) Int. Cl.

| | | |
|---|---|---|
| *B64D 27/24* | (2006.01) | |
| *B60L 50/72* | (2019.01) | |
| *B60L 58/40* | (2019.01) | |
| *H02J 3/38* | (2006.01) | |
| *H01M 8/2475* | (2016.01) | |
| *H01M 16/00* | (2006.01) | |
| *H01M 8/04082* | (2016.01) | |

(52) U.S. Cl.
CPC .......... *B64D 31/06* (2013.01); *H01M 8/2475* (2013.01); *H01M 16/006* (2013.01); B60L 2200/10 (2013.01); B64D 2041/005 (2013.01); B64D 2221/00 (2013.01); H01M 8/04201 (2013.01); H01M 2250/20 (2013.01); H02J 3/387 (2013.01); Y02E 60/721 (2013.01); Y02T 90/32 (2013.01); Y02T 90/34 (2013.01); Y04S 10/126 (2013.01)

(58) Field of Classification Search
CPC ...... B60L 50/72; B60L 58/40; B60L 2200/10; H01M 8/2475; H01M 16/006; H01M 8/04201; H01M 2250/20; H02J 3/387; Y02E 60/721; Y02T 90/32; Y02T 90/34; Y04S 10/126
USPC .......................................................... 307/113
See application file for complete search history.

(56) References Cited

U.S. PATENT DOCUMENTS

| | | |
|---|---|---|
| 2003/0113599 A1 | 6/2003 | Pearson |
| 2004/0043276 A1 | 3/2004 | Hoffjann et al. |
| 2004/0057177 A1 | 3/2004 | Glahn et al. |
| 2005/0206342 A1 | 9/2005 | Aleyraz et al. |
| 2005/0228596 A1 | 10/2005 | Shoji |
| 2006/0138278 A1 | 6/2006 | Gans |
| 2007/0087241 A1 | 4/2007 | Mulvenna et al. |
| 2007/0172707 A1 | 7/2007 | Hoffjann et al. |
| 2007/0229022 A1 | 10/2007 | Hanafusa et al. |
| 2007/0292724 A1 | 12/2007 | Gilchrist |
| 2008/0001026 A1 | 1/2008 | Hoffjann et al. |
| 2008/0038597 A1 | 2/2008 | Hoffjann et al. |
| 2008/0085430 A1 | 4/2008 | MacBain et al. |
| 2008/0133076 A1 | 6/2008 | Formanski et al. |
| 2008/0210812 A1 | 9/2008 | Gans et al. |
| 2009/0126737 A1 | 5/2009 | Aubonnet et al. |
| 2009/0317692 A1 | 12/2009 | Matsumoto et al. |
| 2010/0193629 A1 | 8/2010 | Briet et al. |
| 2010/0221642 A1 | 9/2010 | Frahm et al. |
| 2011/0198231 A1 | 8/2011 | Eickhoff |
| 2012/0058409 A1 | 3/2012 | Maier |
| 2012/0225329 A1 | 9/2012 | Kazuno et al. |
| 2013/0210329 A1 | 8/2013 | God et al. |

FOREIGN PATENT DOCUMENTS

| | | |
|---|---|---|
| CN | 101304785 A | 11/2008 |
| CN | 101342856 A | 1/2009 |
| CN | 201659944 U | 12/2010 |
| CN | 102384306 A | 3/2012 |
| CN | 103171407 A | 6/2013 |
| CN | 103474685 A | 12/2013 |
| DE | 102006042300 | 9/2008 |
| DE | 102007054291 | 4/2009 |
| EP | 1510814 A1 | 3/2005 |
| EP | 2213571 | 8/2010 |
| JP | S60138854 | 7/1985 |
| WO | 1999057335 | 11/1999 |
| WO | 2006058774 | 6/2006 |
| WO | 2007039211 | 4/2007 |
| WO | 2007057188 | 5/2007 |
| WO | 2011089016 | 7/2011 |

OTHER PUBLICATIONS

Europe Patent Application No. 15820622.7, Communication pursuant to Article 94(3) EPC (Office Action), dated Jun. 27, 2018.
International Patent Application No. PCT/IB2015/059493, Invitation to Pay Additional Fees, and, Where Applicable, Protest Fee and Partial Search Report, dated Apr. 5, 2016.
International Patent Application No. PCT/IB2015/059493, International Search Report and Written Opinion, dated Jul. 27, 2016.
U.S. Appl. No. 14/963,850, Requirement for Restriction/Election, dated Sep. 8, 2017.
Europe Patent Application No. 15820622.7, Communication pursuant to Article 94(3) EPC (Office Action), dated Nov. 26, 2019.
Brazil Patent Application No. 112017010916-6, Office Action (including translation), dated Jan. 28, 2020.
U.S. Appl. No. 14/963,850, Notice of Allowance, dated Mar. 26, 2018.

AUTONOMOUS AIRCRAFT FUEL CELL SYSTEM

CROSS REFERENCE TO RELATED APPLICATIONS

This application is a division of U.S. Nonprovisional application Ser. No. 14/963,850, filed Dec. 9, 2015, which application claims the benefit of U.S. Provisional Application Ser. No. 62/089,405, filed Dec. 9, 2014, titled "Autonomous Aircraft Fuel Cell System," the entire contents each of which are hereby incorporated by reference.

FIELD OF DISCLOSURE

Embodiments of the present disclosure relate generally to systems and methods for providing improved aircraft fuel cell systems. In one embodiment, the system provides separate zones, maintaining various equipment components in separate controlled hydrogen concentration zones. In one embodiment, the fuel cell system provided may be simpler such that it functions without a power converter and autonomous such that it functions without need for power from any aircraft supply.

BACKGROUND

Vast numbers of people travel every day via aircraft, trains, buses, and other vehicles. Such vehicles are often provided with components that are important for passenger comfort and satisfaction. For example, passenger aircraft (both commercial and private aircraft) can have catering equipment, heating/cooling systems, lavatories, water heaters, power seats or beds, passenger entertainment units, lighting systems, and other components, which require electrical power for their activation and proper operation. These components are generally referred to as "non-essential" equipment. This is because the components are separate from the "essential" equipment, which includes the electrical components required to run the aircraft (i.e., the navigation system, fuel gauges, flight controls, and hydraulic systems).

One ongoing issue with these components is their energy consumption. As non-essential equipment systems become more and more numerous, they require more and more power. Additionally, because more equipment components are converted to electrically powered equipment (rather that hydraulically or mechanically powered equipment), power availability can become a concern aboard aircrafts. These systems are typically powered by power drawn from the aircraft engines drive generators (although they may derive power from an aircraft auxiliary power unit or ground power unit when the aircraft is on the ground.). However, the use of aircraft power produces noise and $CO_2$ emissions, both of which are desirably reduced. The total energy consumption can also be rather large, particularly for long flights with hundreds of passengers on board.

The technology of fuel cell systems provides a promising, cleaner, and quieter way to supplement energy sources already aboard commercial aircraft. A fuel cell system produces electrical energy as a main product by combining a fuel source of liquid, gaseous, or solid hydrogen with a source of oxygen, such as oxygen in the air, compressed oxygen, or chemical oxygen generation. Fuel cell systems consume hydrogen ($H_2$) and oxygen ($O_2$) to produce electric power. The $H_2$ and $O_2$ gas may be provided via gas distribution systems that generally include high pressure cylinders for storing the gases.

Fuel cell systems are generally designed with two in-line pressure regulators on both gas distribution systems ($H_2$ and $O_2$) in order to expand gases from the high pressure storage cylinders to the low pressure inlets (the appropriate fuel cell inlet pressure for the $H_2$ and $O_2$ gases). The anode and cathode pressure of the fuel cell system should be linked in order to limit the pressure differential between the two fuel cell inlet pressures (anode and cathode) so as to avoid damaging of the fuel cell membrane.

Whenever hydrogen or other potentially explosive gas is in use, there are regulations to be met. For example, the ATEX directive consists of two European directives that outline requirements for what equipment and work environment is allowed in an environment with a potentially explosive atmosphere. (ATEX derives its name from the French title of the 94/9/EC directive: Appareils destinés à être utilisés en ATmosphères EXplosibles.) Fuel cell systems typically need to use ATEX actuators and sensors, and otherwise be ATEX compliant. This disclosure relates to improvements for fuel cell systems that allow them to be ATEX compliant, while reducing the total number of required compliant components and limiting the portions of the fuel cell systems where compliant components are required. This disclosure also relates to improvements for fuel cell systems that allow the fuel cell system to operate autonomously. The fuel cell systems may operate without requiring power from the aircraft. The fuel cell systems may also be designed to operate without requiring a power converter.

BRIEF SUMMARY

Embodiments of the present disclosure relate generally to systems and methods for providing improved aircraft fuel cell systems. In one embodiment, the system provides separate zones, maintaining various equipment components in separate controlled hydrogen concentration zones. In one embodiment, the fuel cell system described may be designed to function without any aircraft power supply, and is thus considered autonomous. In one embodiment, the fuel cell system provided may be simpler than traditional fuel cell systems such that it functions without a power converter.

In one example, there is provided an aircraft fuel cell system, comprising a high pressure hydrogen concentration zone; a low pressure hydrogen concentration zone; each of the high pressure hydrogen concentration zone and the low pressure hydrogen concentration zone comprising a hydrogen concentration sensor; and a blower system configured to provide dilution air to one or both of the zones based on hydrogen-containing gas concentration detected by the hydrogen concentration sensor. The high pressure hydrogen concentration zone may house one or more hydrogen-containing sources. The low-pressure hydrogen concentration zone may house a fuel-cell. The blower system may comprise one or more fans associated with a heat exchanger associated with the fuel-cell system. The system may also include a hybrid regulator that provides a single stage regulation of pressure in the fuel-cell.

There is also provided a method for diluting a hydrogen-containing gas atmosphere, comprising: providing at least two separate zones based on differing operating pressures of equipment contained therein; each zone comprising a hydrogen concentration sensor; detecting a hydrogen concentration within at least one of the zones; if the hydrogen concentration is above a predetermined level, activating a blower system for diluting or removing the hydrogen-containing gas from the zone.

A further example provides an aircraft fuel-cell system, comprising: a fuel-cell; related ancillary equipment for fuel-cell functioning; a battery; a battery charger; a preload resistor; and a series of contactors configured to control the flow of electricity generated by the fuel cell. The series of contactors may comprise a resistor contactor, a fuel-cell contactor, a battery contactor, and a bus contactor. In one example, upon power request from aircraft loads, the battery contactor is closed and the bus contactor is closed and fuel-cell startup procedure is launched. The system may operate autonomously and without being linked to an aircraft power supply. The system may also deliver power to aircraft loads without using a power converter.

There is also provided a method for powering aircraft loads, comprising: providing an aircraft fuel-cell system as disclosed; receiving a request for power from one or more of the aircraft loads; delivering an initial power supply to the loads from the battery; and delivering further power supply to the loads from the fuel-cell.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

While the embodiments described herein find particular use on-board a passenger aircraft and are generally described in relation thereto, it should be understood that the systems may be used on other vehicles, such as buses, trains, spacecraft, water vessels, or any other appropriate transport vehicle equipped with one or more fuel cell systems. Thus, while the fuel cell technology is discussed herein in relation to use in aircraft, it is by no means intended to be so limited. It is also possible for any of the fuel cell systems used in accordance with this disclosure to be low temperature fuel cells, high temperature fuel cells, or any other type of fuel cell.

Fuel cell systems may be used on-board an aircraft (or other vehicle) for generating electrical power. The power may be routed to any appropriate equipment or aircraft loads in order to make use of the power generated. A fuel cell system 10 is a device that converts chemical energy through an electrochemical reaction involving hydrogen $H_2$ or other fuel source and oxygen-rich gas (e.g., air) into electrical energy. The fuel cell system 10 combines an input of hydrogen-containing gas with an input of oxygen and/or air to generate electrical energy (power).

Figure 1:
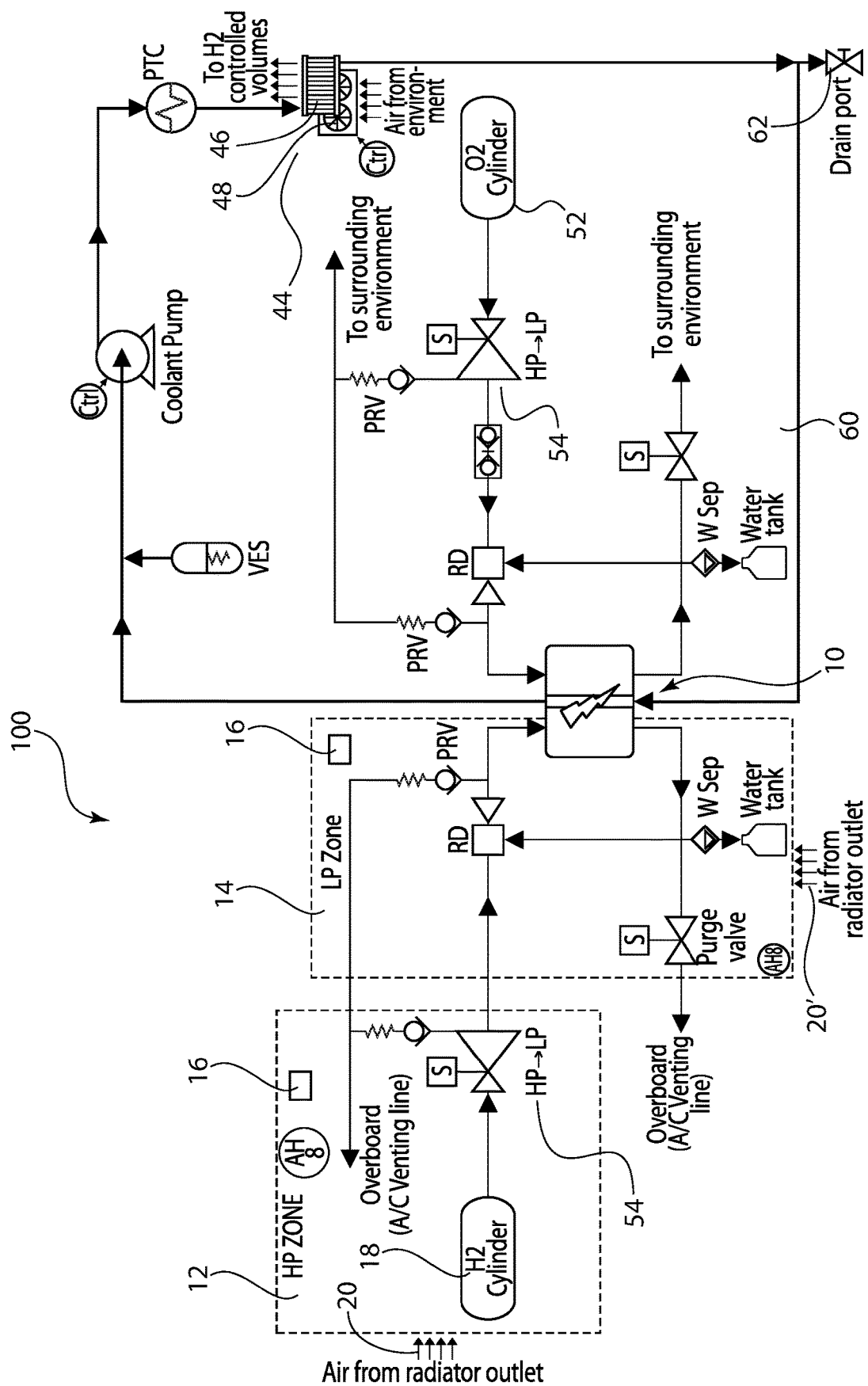
FIG. 1 shows a schematic showing a system fluid architecture, providing a high pressure hydrogen concentration zone and a low-pressure hydrogen concentration zone.

In one example, the present disclosure provides a system 100 for managing hydrogen-containing gas leakage by providing a "high pressure hydrogen concentration zone" 12 (HP zone) and a "low-pressure hydrogen concentration zone" 14 (LP zone). FIG. 1 provides an example of a system fluid architecture showing this feature. As illustrated, there may be provided a high pressure hydrogen concentration (HP) zone 12 that is separate from a low pressure hydrogen concentration (LP) zone 14. The HP zone 12 houses equipment that generally has a high operating pressure. The LP zone 14 houses equipment that has a lower operating pressure inside the equipment. These different zones 12, 14 may be provided in order to help manage any potential hydrogen-containing gas leakage. In one embodiment, each zone is provided as a separate volume with physical boundaries delineating the zone area.

Each zone is also provided with a hydrogen concentration sensor 16. The hydrogen concentration sensor 16 is provided in order to measure hydrogen-containing gas concentration within each particular zone. These sensors used may be of different type/technology in each zone.

The HP zone 12 may be integrated in a controlled volume and provided with a hydrogen concentration sensor 16. As outlined below, continuous dilution of hydrogen (or hydrogen-containing gas) in the HP zone 12 may be ensured either by natural air convection within the controlled volume or by blowing air within the controlled volume using an air blower system 20.

Similarly, the LP zone 14 may be integrated in a separate controlled volume including a separate hydrogen concentration sensor 16. Continuous dilution of hydrogen (or hydrogen containing gas) in the LP zone may also be ensured either by natural air convection within the controlled volume or by blowing air within the controlled volume using an air blower system 20'.

The dilution system 100 configuration described helps prevent ATEX-rated equipment to be used entirely throughout. By separating the HP zone 12 and the LP zone 14 from the remainder of the atmosphere and the system, normal (non ATEX) sensors and actuators can be used with the remainder of the system design.

As shown, the HP zone 12 contains one or more hydrogen-containing sources 18 and any other components, such as piping section through which high pressure hydrogen flows. In one example, the one or more hydrogen containing sources comprise hydrogen cylinders. The LP zone 14 houses at least a portion of the fuel cell device 10 and any other equipment through which the hydrogen-containing gas may flow for power generation. As illustrated by FIG. 1, the LP zone 14 may house the fuel cell. One of the benefits of providing separate zones is that if there is a potential for a hydrogen-containing gas leak in a particular area, all of the equipment in the area needs to be explosion proof. By providing different and separate zones based on different equipment operating pressures, it is possible to keep the equipment contained within each of these zones separate from the remainder of the atmosphere, such that only equipment in the HP zone 12 and in the LP zone 14 need be rated to a particular ATEX level. Any equipment outside either of the HP zone 12 or the LP zone 14 does not need to be explosion proof, or otherwise ATEX rated.

It is possible for the walls of each zone to be explosion-proof, but this is not required. It is also possible to provide a larger perimeter around each of the HP zone 12 and the LP zone 14, but this is not required.

In use, if the hydrogen concentration measured in a particular zone 12, 14 is at or higher than a predetermined acceptable limit (exemplary parameters discussed further below), the system is configured to flow an appropriate air flow rate into the volume of the zone. In one example, this appropriate air flow rate may be delivered via a blower system 20, 20'.

In one example, the blower system 20 may be provided in order to limit the hydrogen-containing gas concentration at the outset. In another example, the blower system 20 may be configured such that if the hydrogen-containing gas concentration measured by the hydrogen sensor 16 inside the controlled volume of the different zones 12,14 reaches a level that is too high, the blower system is activated in order to lower the hydrogen-containing gas concentration to a safe level. The predetermined acceptable limit may be set to address either of these examples.

The predetermined acceptable limit of hydrogen-containing gas concentration may be set to be at a different level in each of the different zones 12, 14. The air flow rate may thus be set to be different as well. In other words, there may be two different detection levels set. Additionally, there may be different levels of flow rates set for an individual zone. The "safe" hydrogen concentration permitted (based on applicable regulations and rules) will likely be the same in both the HP zone and the LP zone, but the $H_2$ leakage rate leading to these concentrations will differ in the HP and the LP zones. This is primarily because the HP zone 12 contains the hydrogen storage 18. The $H_2$ leakage rate leading to a given $H_2$ concentration in the controlled volume will be higher in the HP zone compared to the LP zone. Correspondingly, the air flow rate required to be blown within the volume to maintain the concentration within an acceptable range will be higher in the HP zone than in the LP zone.

In one specific example, a particular rule or regulation may define an acceptable hydrogen-containing gas concentration that can be permitted in a particular area. These limits are often based on the Lower Flammability Limit (LFL) of the gas, which is a physical parameter used to define behavior of gas and its propensity to generate a flammable atmosphere. For example, for a hydrogen-containing gas atmosphere, it may be the case that there should be less than 4% of a hydrogen-containing gas concentration in the air contained within the controlled volume of the HP zone 12 or the LP zone 14. Any amounts greater than this could create a flammable atmosphere. Accordingly, the system architecture disclosed may be set such that any amount of hydrogen-containing gas concentration in the air in a particular zone that is below 25% of the LFL is considered a normal and safe situation (in this example, 1%). In this configuration, the blower system delivers a standard, low-level of air flow rate. If the amount of hydrogen concentration in the air in a particular zone reaches an amount that is between 25 to 50% of the LFL (in this example, up to 2%), then the system increases airflow with the target of lowering the hydrogen concentration to below 25% of the LFL. If the amount of hydrogen concentration in the air in a particular zone reaches an amount that is above 50% of the LFL (in this example, above 2%), the hydrogen supply may be closed and the system may be shut off. Such a hydrogen-containing gas concentration could signal an uncontrolled hydrogen leakage. In another example, if the amount of hydrogen-containing gas concentration in the air in a particular zone reaches an amount that is above 50% of the LFL, the system may increase airflow for a certain amount of time, recheck the hydrogen concentration in the zone, and if not lowered to acceptable levels, the system may then be shut off. These percentages of the LFL (25% and 50%) are the percentages currently used in the industry. It should be understood, however, that the system disclosed may be used in other potentially explosive atmospheres with different gases, and the percentages and numbers may be changed. The above example is for illustration purposes only. If necessary, the system may be modified depending upon any particular rule or regulation from any particular country or based on any particular LFL of an explosive gas. The above strategy may be the same in each of the high pressure zone 12 in the low-pressure zone 14, but the control system may be individual for each zone.

Because the dilution system 100 described herein is positioned on board an aircraft or other closed system, the blower system 20 is generally found to be necessary. The velocity of the vehicle is generally not expected to provide a suitable source of blowing air, due to the location of the fuel cell system on board the aircraft. It may be possible, however for the pressure differential due to altitude to be used to provide some of the blowing/dilution air for the system 100. In this example, it may be possible to take advantage of the pressure difference between inside the aircraft and outside the aircraft. The pressure inside the aircraft is higher, so if an appropriately valved opening is used (e.g., an outflow valve), it would provide a natural air flow from outside the aircraft into the dilution system 100.

In one embodiment, there may be provided a first blower system for the HP zone 12 and a second blower system for the LP zone 14. In an alternate embodiment, it is possible for the high pressure zone 12 and the low-pressure zone 14 to share a single blower system 20. For example, the blower system could split air into two different flows that would each be directed to one of the HP zone 12 or the LP zone 14.

In one example, the air blower systems 20, 20' may be the blower/fan 48 associated with a heat exchanger/radiator 44. This may be a useful re-use of the heat exchanger fan 48, because a heat exchanger 44 is generally provided in connection with the fuel cell in order to manage heat generated by fuel cell functioning. As background, in a fuel cell system, the heat generated by the fuel cell has to be expelled out of the system to maintain its operating temperature at the appropriate level (which is generally between 60° C. and 80° C. for a PEM Fuel Cell system). Generally, this heat is disposed of by a heat exchanger/radiator 44. The radiator 44 has a liquid/air heat exchanger 46 and one or several fans 48 mounted together. The function of the fan(s) 48 is to generate an appropriate and suitable airflow to be blown through the heat exchanger to collect calories out of the fuel cell system cooling circuit. In the proposed embodiment, it is possible to take advantage of the presence of the heat exchanger fan 48 that is already in place with respect to the fuel cell system in order to generate an airflow that would be suitable for both the cooling needs and for the hydrogen dilution needs in the HP and/or the LP zones.

Using the heat exchanger/radiator 44 blower and 48 could prevent the need for providing a separate and dedicated blower system for maintaining acceptable levels of hydrogen-containing gas in each zone for the dilution system 100 described. However, in another example, a separate dedicated blower system 20, 20' may be provided. The HP zone and LP zone may share a blower system. Alternatively, the HP zone and the LP zone may have separate blower systems 20, 20'. It is also possible for one or more of the overpressure devices (e.g., pressure relief valves, burst disk, thermal relief device, and so forth) 62 to be connected to a venting line that blows overboard. This can remove the hydrogen-containing gas from the system and from the aircraft.

The blowing air may all be delivered to a single zone, or the air may be diverted so that it is usable for both zones (in concert, if need be). For example, it may be necessary to direct the air appropriately in order to control the flow rate and the amount required in order to lower the LFL to the desired ranges. There may be provided one or more conduits 60 that function to capture air leaving the heat exchanger/radiator fans 48 and re-direct the air to the dilution system 100. If air is needed for dilution, a valve 62 may remain open that directs air to the dilution system 100. If the air is not needed for dilution, the valve 62 may drain the air from the blowers 48 overboard. A control system associated with the hydrogen concentration sensors 16 may deliver a signal indicating that dilution air is needed if the hydrogen-containing air levels reached a certain predetermined level.

Once the blower system 20 has been activated in order to move air through the particular zone 12, 14 for dilution, the hydrogen-containing airflow exiting zone 12, 14 may be directed either to surrounding air/ambient or to a catalytic burner system that can burn hydrogen contained in the flow and convert it to water. (This is described by co-pending application WO 2014/136098, titled "Aircraft Fuel Cell System with catalytic Burner System".)

Embodiments also provide a method for diluting a hydrogen-containing gas atmosphere, comprising: providing at least two separate zones based on differing operating pressures of equipment contained therein; each zone comprising a hydrogen concentration sensor; detecting a hydrogen concentration within at least one of the zones; if the hydrogen concentration is above a predetermined level, activating a blower system for diluting or removing the hydrogen-containing gas from the zone.

It should be understood that the systems described may be used in connection with other architectures, and are not limited to the use with fuel cells using compressed oxygen and hydrogen. For example, the system may be used with any environment using compressed air, solid or material-based hydrogen storage, or any other potentially explosive environment.

Embodiment of the invention also relates to a hybrid regulator 54 that can provide a one-step pressure reduction directly from high pressure. As background, a fuel cell system 10 typically has a cathode and an anode. An electrolyte allows positively charged hydrogen ions to move between two sides of the fuel cell. The hydrogen ions are drawn through the electrolyte and electrons are drawn from the anode to the cathode through an external circuit, producing electricity. At the cathode, hydrogen ions, electrons, and oxygen react to form water. It can be desirable for the anode and cathode to be provided at a similar pressure. This can be done via a membrane/pressure reducer. For example, there may be provided a pneumatic pressure reducer on the oxygen side that is controlled by hydrogen fluid, using the reference pressure given by the hydrogen line. Alternatively, there may be a pressure reducer on the hydrogen side that is controlled based on the reference pressure given by the oxygen line. Such pressure reducers are generally membrane pressure reducers. In these arrangements, there is oxygen on one side of the membrane, and hydrogen on the other side of the membrane. There may be a pressure sensor on the hydrogen line, and a separate pressure sensor on the oxygen line.

Measuring and managing pressure using this method typically requires two steps, and uses two pressure regulators in cascade. One problem this pressure managing method may pose is the potential for leaks (rupture of the membrane), which can lead to a safety risk. Another drawback of this method is the low precision regulation and the low dynamic response of the pressure regulation.

Some systems use a combination of mechanical pressure reducers and electronically controlled valves with dedicated pressure sensors on each of the oxygen and the hydrogen lines. One problem this may pose is that it is a more complex pressure regulation arrangement, requiring software and specific control laws that can be expensive to develop, and potentially requiring more frequent repairs.

In one embodiment, the present disclosure provides a one-step/single step pressure regulation/pressure reducer system. The system does not require measurement of fluid in another line in order to control the pressure. Instead, there may be a solenoid provided inside the pressure reducer that can directly use information supplied by the system controller and does not need pressure indication from the other line. Hydrogen and oxygen may be expanded from the cylinder pressures (from the hydrogen cylinder 18 and the oxygen cylinder 52) directly to the fuel cell operating pressures. This may be done using a hybrid regulator 54 combining membrane technology and a linear actuator which is able to adapt the preload. This may help ensure that the targeted outlet pressure is achieved, regardless of the inlet pressure. The controllability provided by the hybrid regulator allows removal of the physical pressure link between the anode and cathode sides of the fuel cell. An exemplary system that may provide such precise regulation of the hybrid regulator 54 is shown and described in WO 2015/128690 titled "Gas Pressure Reducer with Electrically-powered Master System."

Figure 2:
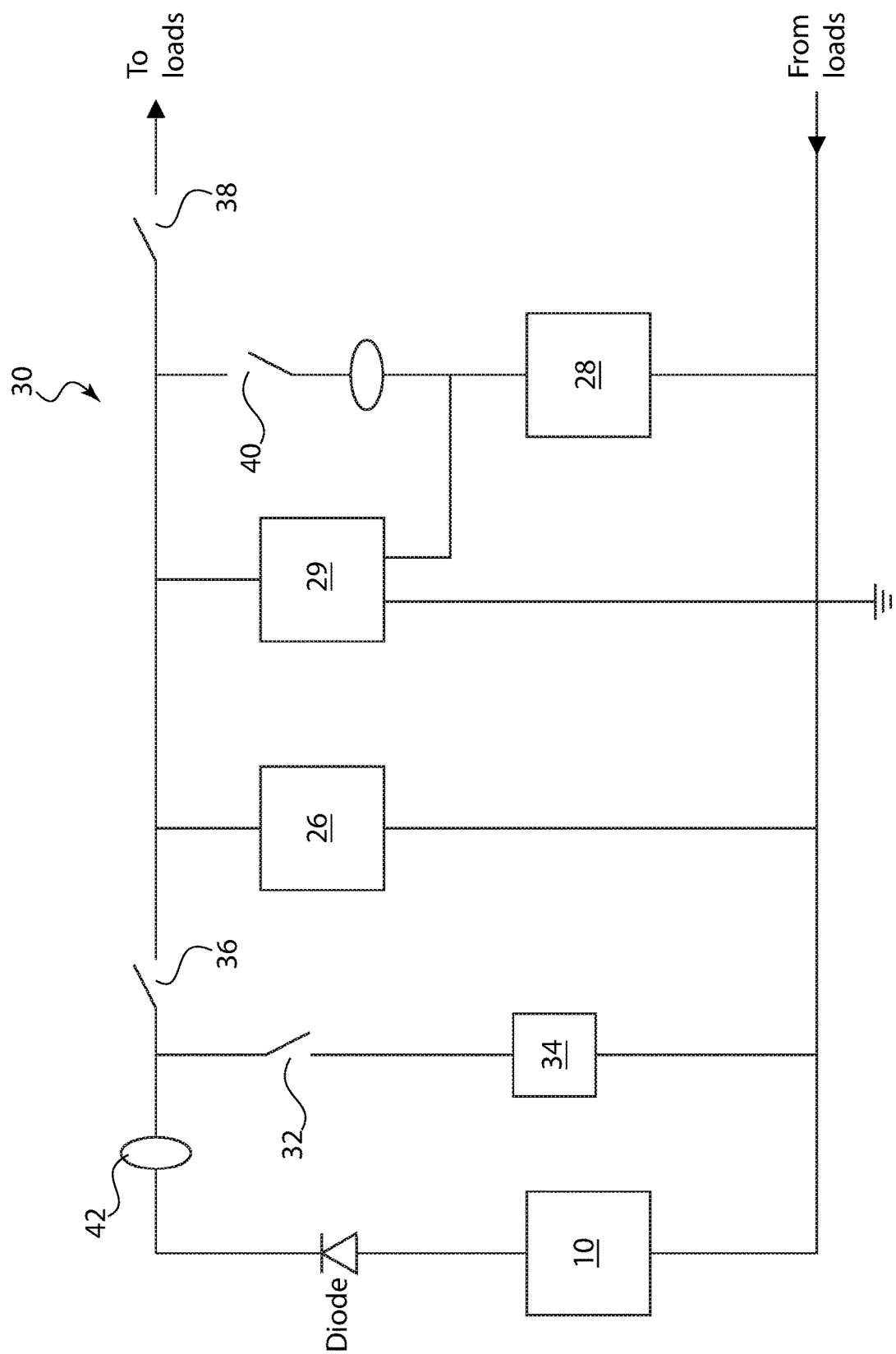
FIG. 2 is a schematic illustrating one embodiment of a system electrical architecture.

Referring now to FIG. 2, one embodiment of a system electrical architecture will now be described. In this example, the fuel-cell device 10 may be used to supply electric energy to the various aircraft loads/equipment to be powered. (It may also power ancillary equipment 26 required to operate the fuel cell itself, such as blower, valves, sensors, compressors, cooling pumps, and so forth.) Fuel-cell voltage is typically different from the voltage required by the equipment to be powered and varies with the power actually supplied to this equipment. For some applications and equipment, it is desirable, however, to provide a constant system output target voltage of about 28 V DC in order to deliver constant power and a constant load. In other applications, it may be desirable to operate at voltages of about 270 V DC. It should be understood that this disclosure may be modified for any appropriate voltage desired. To implement this feature, fuel cell systems typically use power converters to ensure that the electricity generated by the fuel cell is subsequently delivered to the loads being powered at the proper and appropriate voltage. However using power converters in the system degrades system efficiency, which in turn translates into increased hydrogen consumption and therefore increased weight of the complete system. Power converters also need to be controlled by the system controller which makes the control logic and software more complex and costly to develop.

It is also desirable to provide an autonomous fuel cell system that can operate without any need from the vehicle power supply or an external power supply, but still having the highest possible efficiency. In order to provide these features and to function without using a power converter between the fuel-cell and the equipment to be powered, the architecture illustrated by FIG. 2 was developed. The system 30 generally includes a fuel cell 10, a battery 28, and a battery charger 29. The system 30 also includes specific features and equipment allowing operation without a power converter and autonomous operation. The system provides a series of contactors that are appropriately positioned and controlled in the system architecture, including a resistor, electric current sensors, electric power diodes, and a system controller (not shown on FIG. 2). The resistor may be a preload resistor. The system 30 can alleviate the need for a power converter, while still being capable of autonomously and instantaneously supplying electrical power at a defined and constant voltage range to aircraft loads.

Being able to operate without a power converter ensures higher system efficiency and a lower hydrogen consumption, simpler control logic, and improved reliability of the system. These features also allow the aircraft fuel-cell system to operate autonomously and to instantaneously supply aircraft loads with required amount of electric power upon request. For example, the battery 28 may deliver immediate power to aircraft loads while the fuel system starts up. Once the fuel system has started up, it may deliver the required power. The battery thus functions to (a) provide an initial amount of power to aircraft loads at the battery voltage and (b) to provide power for the fuel cell.

In use, the battery 28 imposes the voltage supplied by the system 30 to the loads. In some operating circumstances, the fuel-cell 10 voltage may be lower or higher than the battery 28 voltage. In order to monitor and adjust the voltage and power supplied to the aircraft loads, the disclosed system may be implemented.

As illustrated by FIG. 2, there may be four contactors provided: a resistor contactor 32, a fuel-cell contactor 36, a main bus contactor 38, and a battery contactor 40. The resistor contactor 32 may be positioned between a resistor 34 and a fuel-cell contactor 36. The fuel-cell contactor 36 may be positioned between a fuel-cell sensor 42 and the main bus contactor 38, which is the contactor that allows delivery of power to aircraft loads. The battery contactor 40 may be positioned between the battery 28 and main bus contactor 38 before the loads to be powered.

At startup of the system, the system controller may be powered using power provided by the battery 28. The main bus contactor 38 is open, the battery contactor 40 is open, the fuel-cell contactor 36 is open, and the resistor contactor 32 is open. The system controller can perform an automatic status check sequence. Once this sequence is successfully completed and upon power request from the aircraft loads, the battery contactor 40 is closed and the main bus contactor 38 is closed. This allows the battery 28 to instantaneously provide requested power amount to the aircraft loads at the battery voltage. In parallel, and upon power request of the aircraft loads, the fuel cell start-up procedure is launched. As the fuel-cell 10 is fed with hydrogen and oxygen, the fuel cell voltage rises from 0 to Open Circuit Voltage (OCV). This OCV is typically higher than the requested and targeted aircraft loads voltage. Then the resistor contactor 32 is closed, which as a consequence brings the fuel cell voltage down to a predefined voltage level that is generally at or close to the battery voltage. As long as the fuel-cell voltage is above the predefined voltage level, excess energy is dissipated through the resistor contactor 32. The resistor contactor 32 therefore helps to provide a voltage limiting function.

Figure 3:
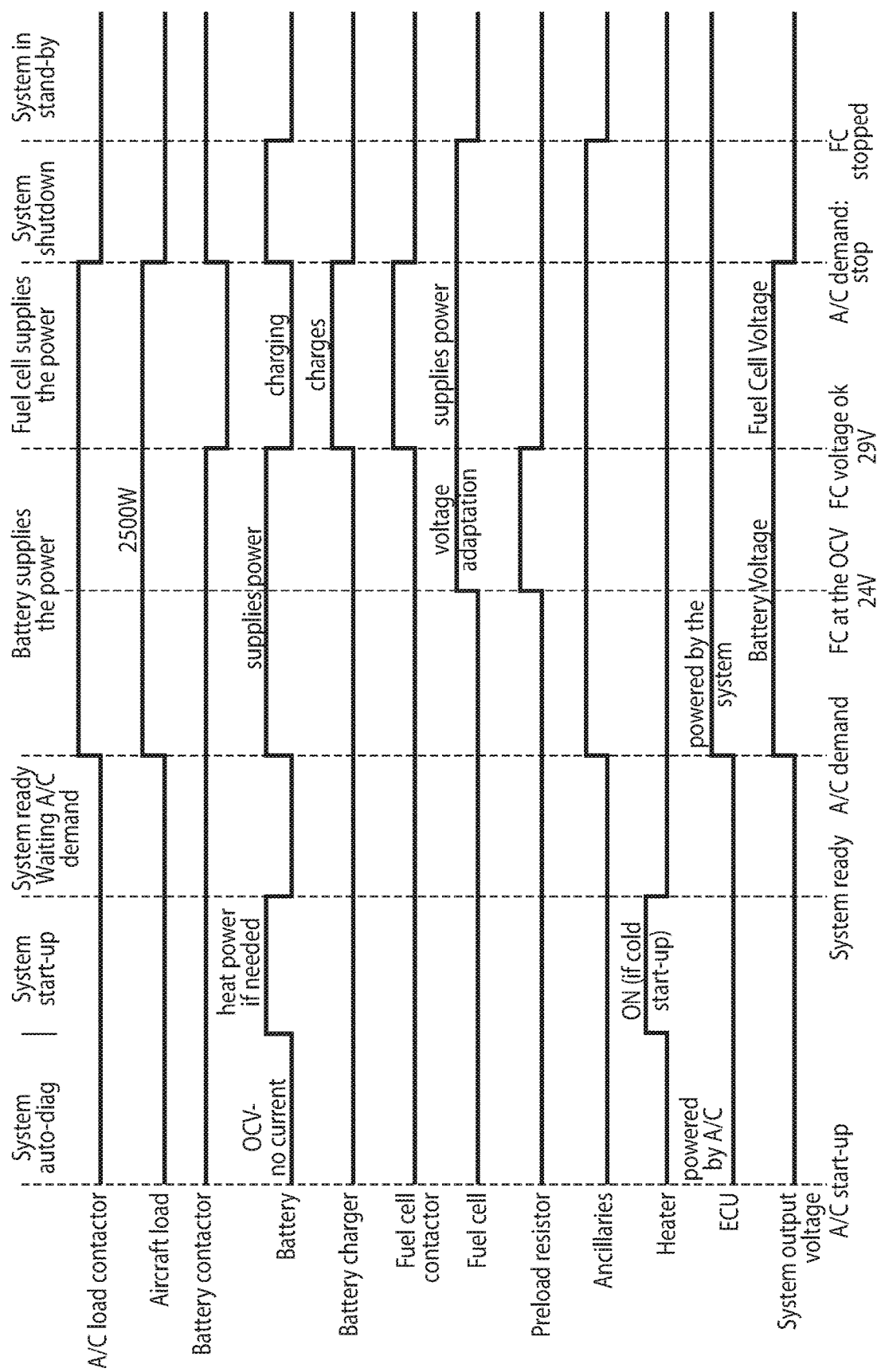
FIG. 3 is a schematic illustrating various state levels of the system of FIG. 2. It illustrates system operation according to target functions in order for the system to operate autonomously, without using the aircraft power supply.

When the resistor contactor 32 is closed, this typically brings the voltage down to the predefined voltage level close to the battery voltage. (The battery voltage is usually 28 V DC, but could be 270 V DC, or any other voltage as appropriate.) The fuel-cell contactor 36 may then be closed in order to both power the ancillary equipment 26—using power generated by the fuel-cell 10 (instead of power generated by the battery) as well as start recharging the battery to the battery charger 29. The preload resistor contactor 32 is then opened. When the battery 28 is recharged, the bus contactor 40 is opened and power is delivered to the aircraft loads using power generated by the fuel-cell system alone. Aircraft systems that may be powered include but are not limited to seats, in-flight entertainment units, galley or lavatory equipment, medical equipment, beds, crew rest area equipment, surveillance equipment, or any other aircraft power load. The battery 28 has been recharged and is now ready for a new sequence. FIG. 3 illustrates one example of the system flow at different points in the power generation process.

Embodiments also provide a method for powering aircraft loads, comprising: providing an aircraft fuel-cell system as disclosed; receiving a request for power from one or more of the aircraft loads; delivering an initial power supply to the loads from the battery; and delivering further power supply to the loads from the fuel-cell.

By providing this electrical architecture, the system 30 is allowed to be fully autonomous, and does not need aircraft power to function. In fact, the system actually functions to provide power to other aircraft loads.

It should be understood that this disclosure relates to any type of fuel cell. In a specific embodiment, the fuel cell is a proton exchange membrane fuel cell (PEM fuel cell). However, it should be understood that the disclosure may also be used in connection with any other type of fuel cell.

Changes and modifications, additions and deletions may be made to the structures and methods recited above and shown in the drawings without departing from the scope or spirit of the disclosure or the following claims.

What is claimed is:

1. An aircraft fuel-cell system, comprising:
   a fuel cell;
   related ancillary equipment for fuel-cell functioning;
   a battery;
   a battery charger;
   a preload resistor; and
   a series of contactors configured to control the flow of electricity generated by the fuel cell, wherein the series of contactors comprise a resistor contactor, a fuel-cell contactor, a battery contactor, and a bus contactor.

2. The system of claim 1, wherein upon power request from aircraft loads, the battery contactor is closed and the bus contactor is closed and fuel cell startup procedure is launched.

3. The system of claim 1, wherein closing of the resistor contactor brings fuel cell voltage to a predefined voltage level that is at or near the battery voltage.

4. The system of claim 1, wherein closing of the fuel cell contactor powers the ancillary equipment and recharges the battery via the battery charger.

5. The system of claim 1, wherein the system operates autonomously and without being linked to an aircraft power supply.

6. The system of claim 1, wherein the system delivers power to aircraft loads without using a power converter.

7. The system of claim 1, wherein the system is configured to provide immediate power to aircraft loads via delivery of initial power from the battery and supplemental power from the fuel cell system once the fuel cell system has completed start up.

8. A method for powering aircraft loads, comprising:
   providing an aircraft fuel cell fuel cell system of claim 1;
   receiving a request for power from one or more of the aircraft loads;

delivering an initial power supply to the loads from the battery; and delivering further power supply to the loads from the fuel cell.

\* \* \* \* \*